US012101331B1

(12) United States Patent
Katta (10) Patent No.: US 12,101,331 B1
(45) Date of Patent: Sep. 24, 2024

(54) METHOD AND A SYSTEM FOR A SECURE HIERARCHICAL COMMUNICATION

(71) Applicant: Aapoon, Inc., Houston, TX (US)

(72) Inventor: Srinivasa Katta, Austin, TX (US)

(73) Assignee: Aapoon, Inc., Houston, TX (US)

( * ) Notice: Subject to any disclaimer, the term of this patent is extended or adjusted under 35 U.S.C. 154(b) by 0 days.

(21) Appl. No.: 18/531,147

(22) Filed: Dec. 6, 2023

(51) Int. Cl.
*H04L 29/06* (2006.01)
*H04L 9/40* (2022.01)

(52) U.S. Cl.
CPC .................................. *H04L 63/105* (2013.01)

(58) Field of Classification Search
CPC ..................................................... H04L 63/105
USPC ............................................................ 726/4
See application file for complete search history.

(56) References Cited

U.S. PATENT DOCUMENTS

| | | | |
|---|---|---|---|
| 2006/0005036 A1* | 1/2006 | Hu | G06F 3/04842 713/182 |
| 2018/0131660 A1 | 5/2018 | Lambert et al. | |
| 2021/0248559 A1 | 8/2021 | Palandro et al. | |
| 2021/0398225 A1* | 12/2021 | Crabtree | G06Q 30/0611 |
| 2022/0394320 A1* | 12/2022 | McIntosh | G06F 16/9532 |

FOREIGN PATENT DOCUMENTS

| | | |
|---|---|---|
| CN | 104796326 A | 7/2015 |
| CN | 106972941 A | 7/2017 |
| CN | 115687740 A | 2/2023 |
| KR | 102551531 B1 | 7/2023 |

OTHER PUBLICATIONS

Distributed Ledgers in Developing Large-Scale Integrated Systems, Marchini, Apr. 2021. (Year: 2021).*

\* cited by examiner

*Primary Examiner* — Jahangir Kabir
(74) *Attorney, Agent, or Firm* — Shumaker, Loop & Kendrick, LLP (57) ABSTRACT

A method and system for facilitating communication in an organization. The method comprises creating a hierarchical messaging structure including one or more hierarchy levels of the organization. The hierarchical messaging structure incudes a plurality of circles structured in a genesis circle and one or more sub-circles, such that each circle includes one or more members. A message is published by a member from at least one of the one or more members of the genesis circle and the sub-circles, wherein the message is dynamically routed according to privilege rights defined in at least one of the genesis circle and the one or more sub-circles. Finally, the message is displayed selectively, at least in one of the genesis circles and one or more sub-circles of the organization.

19 Claims, 7 Drawing Sheets

METHOD AND A SYSTEM FOR A SECURE HIERARCHICAL COMMUNICATION

PRIORITY INFORMATION

The present application does not claim a priority from any other application.

TECHNICAL FIELD

The present subject matter described herein, in general, relates to facilitating communication in an organization and, more particularly, facilitating hierarchical communication in the organization.

BACKGROUND

In both private corporations and government agencies, the task of disseminating messages across various sectors or departments and maintaining seamless communication and collaboration is fraught with challenges. Due to these challenges, there are issues like isolated information silos, redundant work, erratic communication, and troublesome cross-departmental collaboration. Reduced communication effectiveness could result in less cross-departmental cooperation, communication, and knowledge sharing, which can impede overall effectiveness, creativity, and the capacity to make informed decisions based on a comprehensive understanding of the organization. On the other hand, indiscriminate information communication could result in the loss of confidential data and unauthorized access to information.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for a user verification. This summary is not intended to identify essential features of the claimed subject matter nor is it intended for use in determining or limiting the scope of the claimed subject matter.

In one implementation, a method for facilitating communication in an organization is described. The method may comprise creating a hierarchical messaging structure comprising one or more hierarchy levels of the organization. The hierarchical messaging structure may comprise a plurality of circles structured in a genesis circle and one or more sub-circles. It may be noted that a circle may include one or more members. A message is published by a member from at least one of the one or more members of the genesis circle and the sub-circles, wherein the message is dynamically routed according to privilege rights defined in at least one of the genesis circle and the one or more sub-circles. Finally, the message is displayed selectively at least in one of the genesis circle and the one or more sub-circles of the organization. In one aspect, the aforementioned method for facilitating communication in an organization may be performed by a processor using programmed one or more instructions stored in a memory.

In another implementation, a system for facilitating communication in an organization is described. The system is configured to create a hierarchical messaging comprising one or more hierarchy levels of the organization. The hierarchical messaging structure comprises a plurality of circles structured in a genesis circle and one or more sub-circles, such that each circle includes one or more members. A message is published by a member from at least one of the one or more members of the genesis circle and the sub-circles, wherein the message is dynamically routed according to privilege rights defined in at least one of the genesis circle and the one or more sub-circles. Finally, the message is displayed selectively at least in one of the genesis circle and the one or more sub-circles of the organization.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for facilitating communication in an organization disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figures depict embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "creating," "adding," "arranging," "publishing," "displaying," "converting," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for facilitating communication in an organization. It may be noted that the term organization used hereinafter may refer to, but is not limited to, businesses, political parties, religious organizations, universities, educational institutes, non-profit organizations, and other organizations with large numbers of users. A centralized framework for communication is required in organizations to allow for the efficient dissemination of messages across groups of users in the organizations. Without a well-defined grouping mechanism, managing and maintaining effective communication channels across the organization becomes increasingly challenging. Large organizations in the private or government sector face significant difficulties when sending messages and facilitating communication among various sections/ departments. A coherent grouping structure is necessary to keep all sectors connected and aligned.

A potential solution to this problem is implementing a comprehensive system, as disclosed in the present application, that enables the organization to establish and manage groups aligned with the company's organizational structure. This system allows streamlined communication, efficient and controlled communication, ensures that messages reach the relevant sections/departments promptly, i.e., reduced time span, maintains data confidentiality, enforces access rights, sections/departments collaborate efficiently, enhances organizational efficiency, and facilitates effective decision-making processes.

Figure 1:
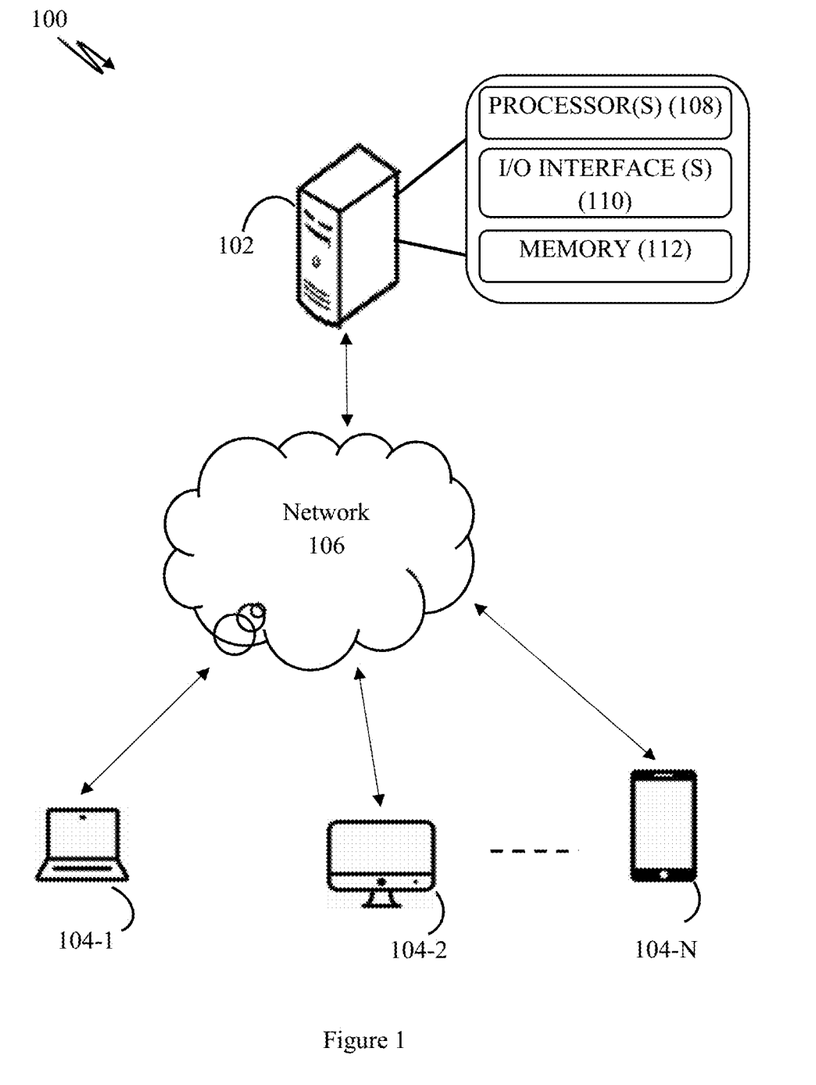
FIG. 1 illustrates a network implementation for facilitating communication in an organization, in accordance with an embodiment of the present subject matter.

Referring now to FIG. 1, a network implementation 100 of a system 102 for facilitating communication in an organization is disclosed. The communication may take place over a messaging platform, such as an app-based messaging platform that may be used on smart phones and mobile devices or desktops/laptops and the like. Initially, the system 102 may create a hierarchical messaging structure that comprises one or more hierarchy levels of the organization. In an example, an application or a messaging platform may be installed on a user device 104-1. A user may interact with the application or the messaging platform via the user device 104-1. It may be noted that the one or more users may access the system 102 through one or more user devices 104-1 . . . 104-N, collectively referred to as user devices 104, hereinafter, or applications residing on the user devices 104. In an embodiment, the system 102 may maintain the back end of the messaging platform with user details, structure of hierarchy, privilege rights, and the like. In an embodiment 102, the system may apply one or more rules for publishing messages. In an embodiment, the user device 104 may control the front-end, displays the structure of hierarchy, and allows users to create accounts, publish messages, read messages, and the like.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be in communication with multiple users through one or more user devices 104-1, 104-3 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for facilitating communication over the messaging platform. At first, a user may use the user device 104 to access the system 102 via the I/O interface 110. The user may register the user device 104 using the I/O interface 110 in order to use the system 102. In one aspect, the user may access the I/O interface 110 of the system 102.

In particular, the system may create a hierarchical messaging structure that comprises one or more hierarchy levels of the organization. The system further publishes a message such that the message is dynamically routed according to privilege rights defined in at least one of a genesis circle and one or more sub-circles. The message is selectively displayed at least in one of the genesis circle and the one or more sub-circles of the organization. The system enables two-way communication in the organization by moderation of the privilege rights. The system stores the published messages and queries the stored messages. The system further derives insights from the stored messages. The insights include at least one of sentiment analysis, text classification, the member behavior analysis, language preference, messaging pattern, and communication trends. The system further creates genesis circles and one or more sub-circles under the genesis circle. The system analyzes the messages prior to publishing and provide access to the published messages to the newly joined members. The detailed functioning of the system 102 is described below with the help of figures.

Figure 2:
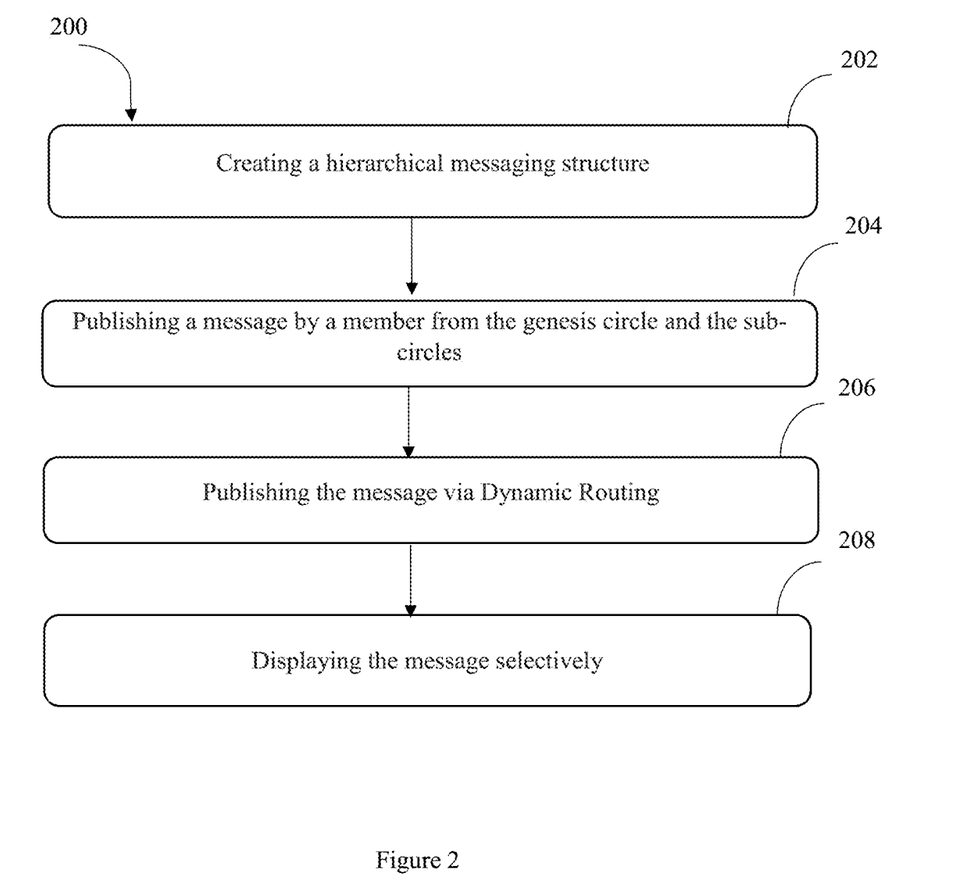
FIG. 2 illustrates a method for facilitating communication in an organization, in accordance with an embodiment of the present subject matter.

Referring now to FIG. 2, a method 200 for facilitating communication in an organization, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for facilitating communication in an organization. Additionally, individual blocks may be deleted from the method 200 without departing from the scope of the subject matter described herein. Furthermore, the method 200 for facilitating communication in an organization can be implemented in any suitable hardware, software, firmware, or combination thereof. However, for ease of explanation, in the embodiments described below, the method 200 may be considered to be implemented in the above-described network 100 of FIG. 1, by the processor(s) 108 of the system 102 in association with the other devices in the network 100.

At step 202, the system 102 may create a hierarchical messaging structure to facilitate communication in an organization. The hierarchical messaging structure comprises one or more hierarchy levels of the organization. The hierarchical messaging structure comprises a plurality of circles structured in a genesis circle and one or more sub-circles such that each circle may include one or more members. A circle may be a user group having one or more members at a particular hierarchy level in a particular division in the organization. In an embodiment, a member may be a member of more than one circle—for example, the member works in more than one division in the organization. The hierarchy level of the organization may be based on at least one of a designation, an authority, an expertise, a project, a responsibility, and the organization structure. For example, for a business organization, a hierarchy level may represent departments, teams, projects, and the like. In yet another example, if a political party represents an organization, then the hierarchy level may correspond to committees, candidates, or regions. If an organization represents a religious organization, then the possible hierarchy level may represent congregations, ministries, or events. In another example, when the organization is a university, the hierarchy level may be departments, courses, student organizations, and the like.

Figure 3:
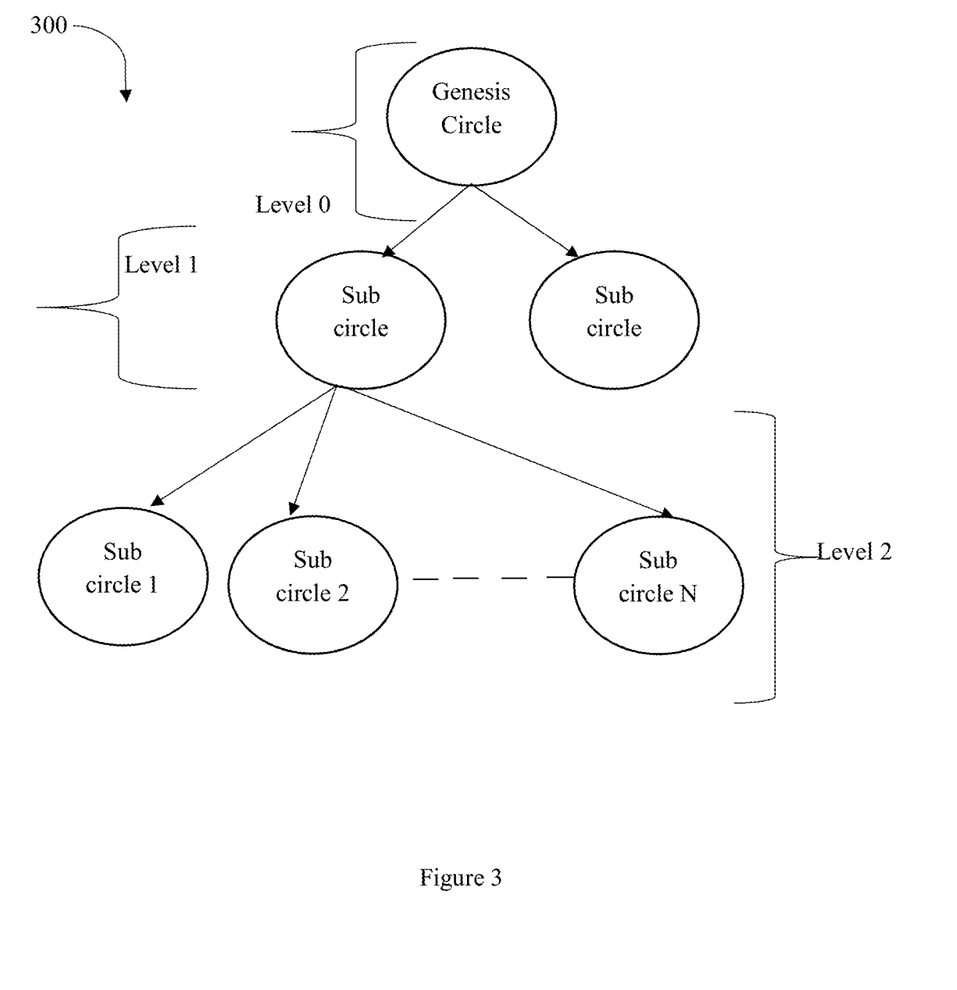
FIG. 3 illustrates creation of a genesis circle and sub-circles, in accordance with an embodiment of the present subject matter.

To create the hierarchical structure, the processor 108 is configured to enable a user of the messaging platform to create the genesis circle. The processor may create the genesis circle based on a received user input via a user device interface. In an embodiment, the user may join the genesis circle. The genesis circle, being the first circle of the hierarchical structure, represents the topmost level in the hierarchy. Further, the user may join the genesis circle and become a chief administrator of the genesis circle. For example, as illustrated in FIG. 3, the first circle at level 0 (referring to FIG. 3) may be the genesis circle. In order to join the genesis circle, the chief administrator must be a verified member. The system may include a user authentication mechanism to ensure that the chief administrator is a verified member. In an embodiment, the authentication mechanism may include multiple levels of user authentication mechanism, such as a complete verification mechanism or a basic verification mechanism. In the complete verification mechanism, the system may receive one or more government identification documents for verification from the user. The user may not need to provide government identification documents for basic verification. The system may receive identification documents other than government-issued Identification (ID) documents from the user for basic verification. The chief administrator may be a completely verified member or a basic verified member. In an alternate embodiment, the government-issued ID might not be used as a valid ID card obtained by an authorized organization such as an educational institute or organization such as a bank, and would be required for multiple levels of authentication mechanisms.

In an embodiment, each circle or sub-circle in the hierarchical structure may be associated with a particular geographical boundary. For example, in a scenario when sub-circles represent different districts under a genesis circle representing the state, each sub-circle would be associated with a specific geographical boundary corresponding to its respective district. The state circle may encompass all the districts, forming the overall geographical boundary of the state. Thus, the sub-circles and circle create a geofencing framework. Geofencing plays a vital role in making sure individuals are placed in the correct circles or positions, adhering to the rules and protocols established by the organization for a particular geography or the region. This is critical for improving organizational efficiency, security, and compliance. For instance, a crucial component for organizations like an election commission or a political party may use a geofencing framework to verify and confirm that if users belong to a designated geographical area.

In an exemplary embodiment, during an election campaign, a political party (an organization) may plan an event or attempt to connect with prospective voters in particular geographic areas, such as districts or constituencies. In order to ensure that the individuals or voters engaging with the campaign, attending events, or participating in surveys are actual residents of those particular areas. The individuals who wish to engage with the campaign or participate in events may register using a government-issued identification (ID) card but not limited to a driver's license, passport, Social Security card with Social Security number (SSN), and Aadhar card issued to the users. Geofencing may be applied by verifying the location details present on the government-issued identification (ID) of the users. For example, during registration on the messaging platform, the system may verify the driver's license or Aadhar card details. In an embodiment, simultaneously, the user's location may be checked against the geofences to confirm their presence within the specified electoral area. In yet another example, the user may be given access to the relevant campaign features, events, or information unique to that region if the driving license verification is successful and their location falls within the set geofences. For example, users may register for the rally and receive event notifications if they are verified as residents of that area using driver's license verification. In yet another example, only users who are either within or in close proximity to an area impacted by a natural disaster or calamity will receive notifications if their driver's license or Aadhar verification is successful and their location matches with the defined geofence. The users may be selected based on their registered geo-locations, for example, using the pin/zip code they provided. In another embodiment, the geo-location of users can be determined based on the Global Positioning System (GPS) location of the user device. Alternatively, the geo-location can be determined using Wi-Fi positioning, cell tower triangulation, or through user-provided location on the messaging platform.

In an embodiment, the processor of the system 102 may be configured to add one or more sub-circles to the genesis circle. The sub-circle from the one or more sub-circles is placed below the genesis circle in the hierarchy level of the organization. In an embodiment, the sub-circles may be added up to a pre-determined number of levels. For example, if the organization represents a business organization, and the genesis circle represents a team leader, then the sub-circles representing project managers may be placed below the genesis circle representing a team leader. Each circle, including sub-circles, may be assigned a hierarchy level indicator. The genesis circle holds the highest level (e.g., level 0). Sub-circles created under the genesis circle are designated at the first level (level 1), and subsequently, sub-circles created under these become second-level sub-circles (level 2), and so forth. In yet another embodiment, there may be more than one genesis circle holding the highest level in the hierarchy depending upon the structure of the organization. In an embodiment, all the features disclosed in this application for one genesis circle in the organization may apply to all the genesis circles at the topmost level. For example, as shown in FIG. 3, there may be N sub-circles at level 2. In another embodiment, there may be N number of circles or sub-circles for any given level of the hierarchal structure. In an embodiment, data related to the user, such as specific circles associated with the user, circle type, level of the circle in the hierarchy, and the like, may be stored in a tabular format in a database.

For example, the chief administrator may authorize, via user device interface, at least one of one or more members of the genesis circle and one or more users of the messaging platform to create one or more sub-circles under the genesis circle (refer to FIG. 3). The sub-circles may correspond to a group of one or more members. The one or more sub-circles under the genesis circle corresponds to a first level in the one or more hierarchy levels of the organization. In an embodiment, the one or more members authorized to create the one or more sub-circles under the genesis circle may be basic verified members. In yet another embodiment, one or more members authorized to create one or more sub-circles under the genesis circle may be completely verified members. In an embodiment, the system may store information related to the one or more members of the genesis circle and their sub circles in a database associated with the system's memory. For example, details of the members, like name, address, email address, role, designation, corresponding level of the hierarchy, and the like, are stored in the system's memory. In an embodiment, when one or more members are added or removed from the genesis circle or the sub-circles, the system may be configured to update the details in the database accordingly.

Further, the system may authorize, via the user device interface, at least one of the one or more members of the genesis circle, the one or more users of the messaging platform, and one or more members of the sub-circles at the first level to create one or more sub-circles at a second level under the one or more sub-circles of the first level. In one embodiment, the system may create the one or more sub-circles at a second level under the one or more sub-circles of the first level. In an embodiment, the chief administrator may perform the authorization to create the one or more sub-circles at the second level. In an embodiment, one or more members may be authorized based on their designation, role, authority, and the like. In an embodiment, the system may verify the authorized members to be authenticated members to create the sub-circles at the second level. The verification mechanism may work as discussed in the above description. In an embodiment, one or more members failing the verification may not be permitted to create the sub-circles. In an embodiment, the system may prompt the failing members, via the user interface, to submit one or more documents for authentication. In an embodiment, the chief administrative user may revoke authorizations of the one or more members present at any level of the hierarchy structure.

In an embodiment, the processor is configured to arrange the genesis circle and the one or more sub-circles according to a hierarchy structure of the organization when displaying the structure on the UI of a user device. The system may store the arrangement of the genesis circle and the one or more sub-circle in the memory. The arrangement may be based on a relationship between the genesis circle and sub-circles of the organization. For example, the processor may analyze the one or more hierarchy levels associated with the genesis circle and sub-circles for arranging them according to the hierarchy structure of the organization. The processor may utilize methods like but not limited to graph-based algorithms or tree traversal methods to arrange the genesis circle and sub-circles in the hierarchy.

Referring to FIG. 2, at step 204, the processor of the system may be configured to publish a message by a member in at least one of the genesis circle and the one or more sub-circles. It may be noted that the member may be either from the genesis circle or the sub-circles of the organization. The system may provide an interface, via the user device, to the one or more members of the genesis circle and sub-circles to create, edit, draft, format, customize message for publishing. The message may be dynamically routed according to privilege rights defined in at least one of the genesis circle and the sub-circle. The privilege rights outline the permissions and access levels that one or more members possess within specific circle. In an embodiment, the privilege rights may be defined by at least one of: the chief administrator, one or more authorized members of the genesis circle or sub circle of the hierarchy, and the user of the messaging platform. For example, one or more authorized members are the members authorized by the chief administrator. In another example, the authorized members may be authorized by the user of the messaging platform.

The privilege rights may define who can access, view, discuss, publish, the message. The privilege rights may vary according to the hierarchy level of the organization. For example, the chief administrator may possess extensive privilege rights in the hierarchy. In an embodiment, the system may enable the authorized members or the chief administrator to change or modify the privilege rights upon meeting a condition but not limited to adding or removing of one or more members in the genesis circle or sub-circles. In an embodiment, the message may be dynamically routed (as shown in step 206) to different circles or sub-circles based on the privilege rights. The dynamic routing may indicate that the path or destination of the message isn't fixed but is determined dynamically according to one or more of privilege rights of a member, suggestions/recommendations provided by the system, and the like. For instance, referring to FIG. 3, the messages may be dynamically routed to a specific sub-circle or circle at a particular level or to all the circles or sub-circles across the hierarchy simultaneously. In an embodiment, the messages may be dynamically routed to each member of a respective sub-circle or a genesis circle simultaneously.

Figure 5:
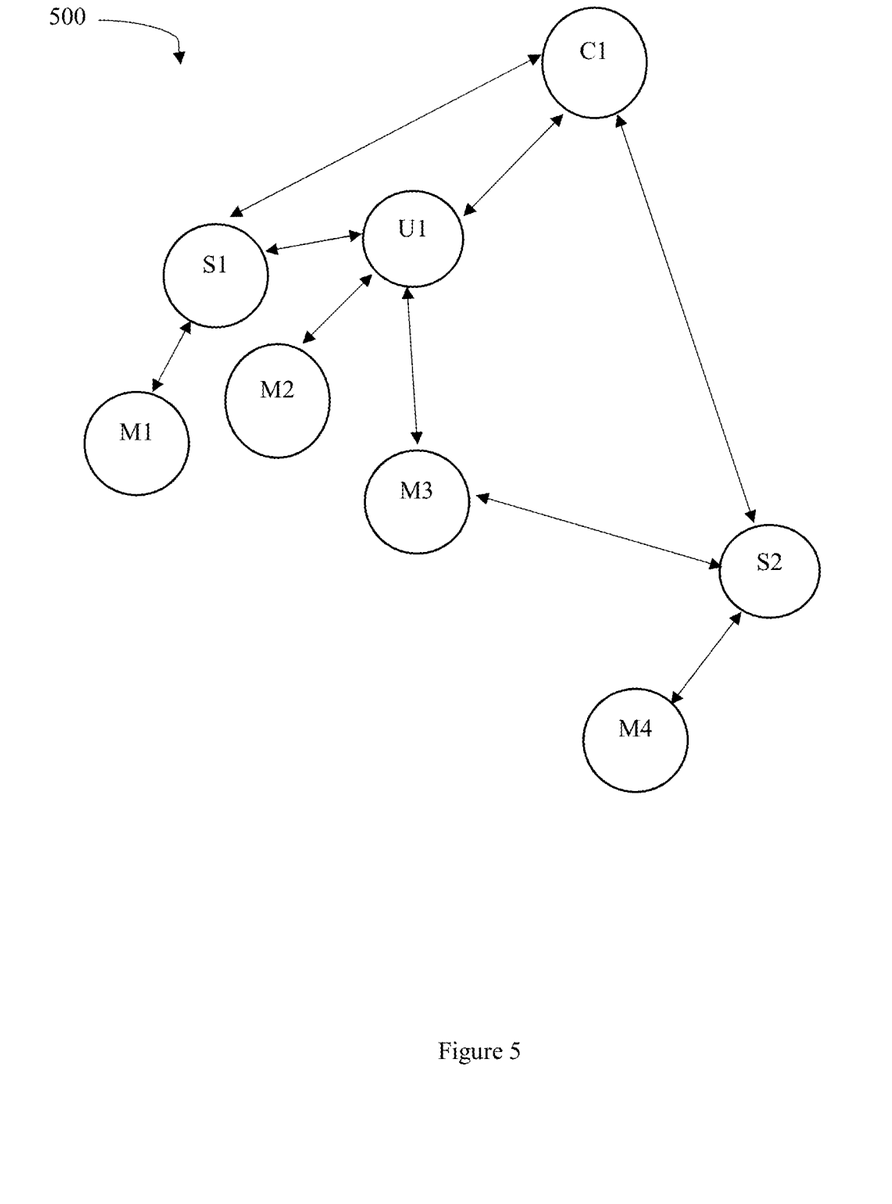
FIG. 5 illustrates an interaction of nodes in a messaging platform, in accordance with an embodiment of the present subject matter.

The dynamic routing in the system is enabled by implementing various entities as nodes. For example, entities like messages, circles or sub-circles, and members may act as nodes. Furthermore, these nodes are connected to various other similar or dissimilar nodes based on an interaction between these nodes. In an embodiment, if a message is represented as node M1 that is being published by a member node U1 in a genesis circle node C1, then based on different properties of these respective nodes each node will be represented as shown in FIG. 5. Subsequently, when another member node U2 wants to publish a message M2, then the system may dynamically route the messages by recommending various circles or sub-circles to publish the messages simultaneously.

The various circles in the hierarchical structure are indicative of different levels in an organization. Further, the dynamic routing of the messages is done based on the privileged rights defined for a given member of a particular circle. The privilege rights define who can send and receive messages within specific circles, ensuring that the message is dynamically routed only to circles with the appropriate authorization. For example, if a director of a company or an organization publishes a message via the hierarchical messaging platform as per an embodiment of the invention. The message may be dynamically routed to only the heads of various departments since they have the privilege rights to receive the message. This method of message distribution ensures that communications from the director regarding the company's overall strategy, objectives, or noteworthy changes are sent directly and expeditiously to the heads of each department.

In another embodiment, the dynamic routing of the messages may take place based on a node and its property. For example, one or more published messages may act as a node such that each message node may include a unique identifier identifying the message node, metadata, and content of the message. Similarly, the members of the circle may act as a node such that each node may have their own profiles, contact lists, and access permissions. Furthermore, each circle, such as the genesis circle (C1) or sub-circle (S1 or S2), may act as a node such that circle nodes may store information about the one or more members within a circle. In an exemplary embodiment, the nodes and their interaction are depicted in a hierarchical structure of FIG. 5. Each member (for example, U1, U2) in FIG. 5 of the respective circle may act as a node. The member node may be further connected with the other nodes, like message nodes M1, M2, M3, and M4. The message nodes M1, M2, M3, and M4 are the messages sent or received by the member nodes U1 and U2, representing their interactions with the hierarchical structure. In an embodiment, the messages may have further nodes, which may include replies, comments, or further discussion threads related to the original message.

In an embodiment, when a new message is to be posted by a member or a publisher, the system may recommend one or more circles or sub-circles by determining degree of similarity between, for example, nodes presented in the hierarchical structure of FIG. 5. In one of the embodiments, the system may determine a cosine distance to assess the similarity between different nodes in the hierarchical structure, offering a recommendation mechanism for message publication. For instance, considering a scenario where the hierarchical structure represents an organization structure, and a member U1 from node C1 expresses the intent to publish a message. The system may determine the respective cosine distance between node C1 and each of the nodes, such as S1 and S2.

Figure 6:
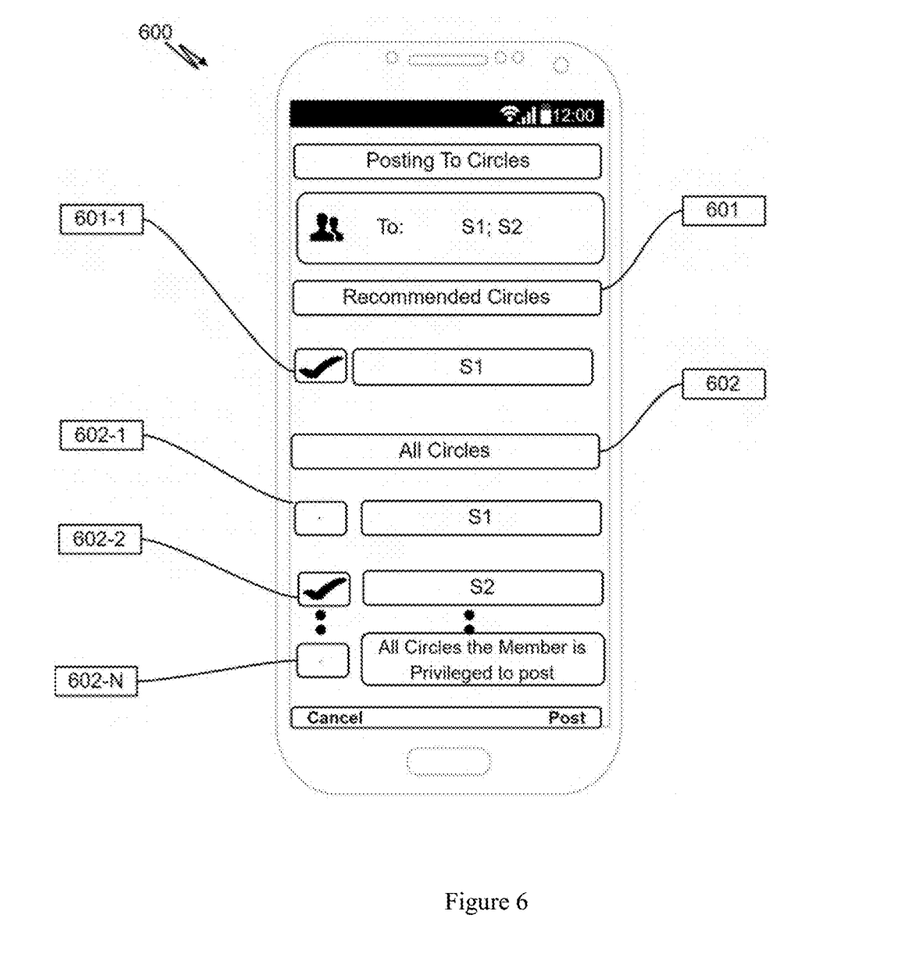
FIG. 6 illustrates an exemplary user interface displaying the recommendation provided by the system, in accordance with an embodiment of the present subject matter.

Illustrating this with the help of an example: a member of the node C1 wants to publish a message pertaining to cybersecurity. The system may analyze the context of the message like message's language, sentiment, topics, entities, themes, and other pertinent attributes using a message analyzer model (explained later in the disclosure) to calculate a similarity between C1 and nodes S1 and S2 to determine which is more closely aligned with the context of cybersecurity. The system recommends the node (U1 or U2) with the smallest cosine distance to C1, as a smaller cosine distance signifies a higher similarity. For example, as illustrated in FIG. 6 the system may recommend circles (601), for example, sub circle S1 is being recommended by the system based on the determined cosine distance, to publish the message via 601-1. The message may be published to all the members of the sub-circle S1. The system may also provide an option to publish the message to all circles (602), for example, the message may be published to sub circles S1, S2, or any other circle to which the member is privileged to publish, via interfaces 602-1 . . . 602-N, respectively.

In yet another example, to determine similarity, the system may determine one or more common features between the members associated with same or different circles using or one or more machine learning algorithms or Natural Language Processing (NLP) Module. The one or more common features may be communication frequency, like a total count of messages, calls, or time since last interaction happened, common topics or keywords in the messages exchanged, overall sentiments of the messages exchanged, participation in activities, common groups joined, demographics, average response time, average message length, conversation initiator, and the like. In an embodiment, the system may recommend the circles or sub circles, based on number of common features being greater than a predetermined threshold. For example, to recommend one or more circles or sub-circles to which the message may be shared when the common features between the user publishing the message and the circles be greater than 5, where 5 is the threshold. In an embodiment, the message nodes may store details of the recipients of the message, which may be specific member nodes, circle nodes, or a mix of both. Based on the message node's information, the system may dynamically determine the message's recipients and route the message dynamically.

In an embodiment, the system may allow the member to select the target circle or sub-circles to publish the message via a drop-down menu. The system may allow the member in real time to select at least one of the genesis circles and the sub-circle to publish the message. In an embodiment, the system may provide one or more options, maybe via a drop-down menu, to publish the message across the hierarchy of the organization. This feature may be called a super select feature. Thereby allowing all the members of the organization to view, reply, react, and the like to the published message. In an embodiment, the system may configure the privileged rights for allowing only a verified member to send the message. When a member may attempt to send a message, the system may check the verification status and allows the action only if the member is a verified member.

In yet another embodiment, the system may allow an administrator of the circle to set the privileged rights for allowing only a verified member to send the message. The administrator of the circle may be a member who has created the circle. The administrator may be selected by the chief administrator, user of the platform, or one or more members selected by the chief administrator user. The system may determine if the selected administrator is a verified member. Upon determination that the administrator is a verified member, the system may allow the member to send the message in any one of the target circle or sub-circles.

In an embodiment, the analysis of the message is performed using a message analyzer model. The message analyzer model may use one of machine learning, artificial intelligence (AI), and natural language processing (NLP) methods, and the like. In an embodiment, the message analyzer model may be invoked when a member indicates their intent via a graphical user interface to share the message. The message's language, sentiment, topics, entities, themes, and other pertinent attributes may be examined while the model analyses the message's content. The message analyzer model analyses data and produces an outcome. The outcome encapsulates the knowledge and data acquired from the analysis. For example, the outcome may include information about sentiment (positive, negative, or neutral), identifiable entities (names, locations), categorized themes, and possibly any issues or red flags. The generated outcome becomes a crucial input for the decision-making process related to publication of the content of the message.

In an embodiment, the system may compare the outcome with predefined criteria and rules to determine the content that should be published in the message. The system may suggest, based on the comparison, which circles or sub-circles the message should be shared with. In an embodiment, the system may suggest additional edits or recommendations for the content of the messages or maybe circles or sub-circles in which the content may be published, based on the analysis. The system may provide suggestions or recommendations via user graphical interfaces by way of visual, audio, haptic or any other signal. In an embodiment, the system may integrate notification mechanisms that alert members about newly published messages within their relevant circle or sub-circles. This feature ensures that critical information is not missed.

In an embodiment, the message is selectively published based on the outcome of the message analyzer model. For example, once the outcome is suggested by the message analyzer model, the system may allow the member to select the circles or sub-circles in which the member would like to publish the message. The selection may be performed via for example a drop-down menu. In an embodiment, the system may verify the member before selectively publishing the message in the desired circles or sub-circles. The system may check if the member is authorized for publishing the message in these circles or sub-circles. Once the message is published, the system may allow the members of the circles or sub-circles to engage with the content of the message, such as commenting, liking, sharing, and the like. In an embodiment, within the selected circles or sub-circle, published messages are displayed in real-time. Over time, the analysis of various messages contributes to the refinement of the message analyzer model. The model learns from user interactions, feedback, and engagement data, enhancing its ability to provide relevant suggestions and insights for future messages.

At step 208, the system may be configured to display the message selectively at least in one of the genesis circle and the one or more sub-circles of the organization. The system may display the message via user device interface of the user device. In an embodiment, the system may process the one or more circles or sub-circles to be in a list view, tree view, and the like. For example, in the list view the presentation of circles is linear and frequently vertically stacked. Each circle may correspond to a row or a list item. Each list item may display details about each circle, such as its name, category, and possibly a small explanation. List views enable users to swiftly scroll through their options while effectively presenting a reasonable number of circles.

In yet another example, in the tree view each entity may be represented as circles or sub-circles and are organized into a hierarchical structure. The top-level entity for example, the first circle may be positioned at the highest point, with subordinate entities displayed as child entities for example, sub-circles, beneath the top-level entity. Tree views often allow users to expand or collapse branches, providing a clear and navigable way to explore and understand complex hierarchical structures, such as organizational hierarchies or file directory systems. Each entity in the tree view typically includes details about the represented entity, enhancing user comprehension.

Figure 4:
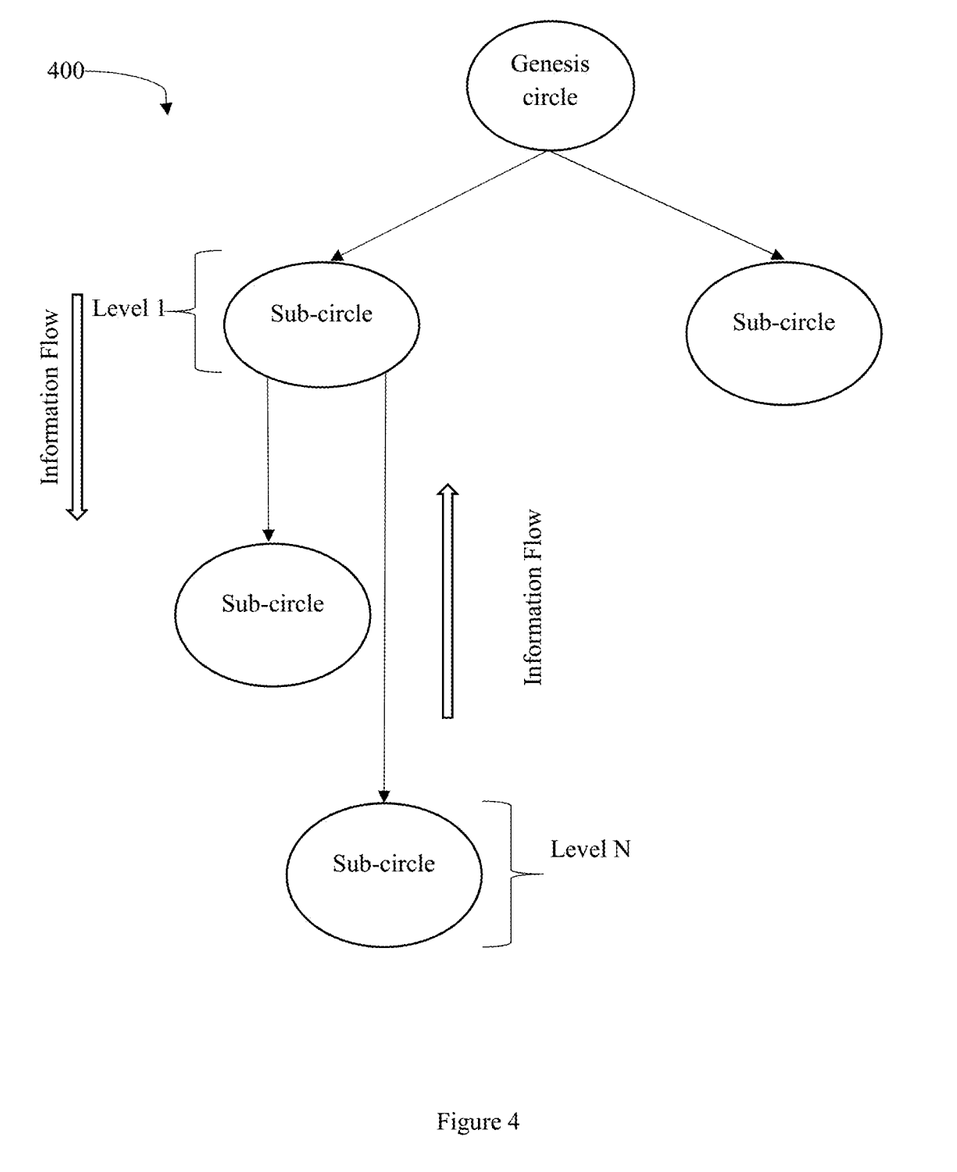
FIG. 4 illustrates a bi-directional flow of information, in accordance with an embodiment of the present subject matter.

In an embodiment, the system may enable a two-way communication in the organization. The two-way communication may refer to a bi-directional communication such that the information may flow from one or more circles or sub-circles at a level higher in the hierarchy to a lower level and vice versa. For example, as illustrated in FIG. 4 the information may flow from the sub-circle at level 1 to circles at lower level. Also, the information may flow from the sub-circle at level N to sub-circle at level 1.

In an embodiment, the circles, and sub-circles at lower level of hierarchy may be able to publish messages in circles and sub-circles pertaining to higher hierarchy level. The system may enable two-way communication, for example by moderation of the privilege rights. The privilege rights may refer to the permissions and access levels that members have within specific circles or sub-circles. Moderation may involve setting permissions for different actions, such as posting, commenting, and accessing certain content, publishing messages, and the like.

In an embodiment, the system may allow an administrator of the circle to make moderations or modifications to the privilege rights. For example, a member who creates a circle may be the administrator of the circle. In yet another example, a person who is authorized as an administrator by the chief administrator may be the administrator of the circle.

Figure 7:
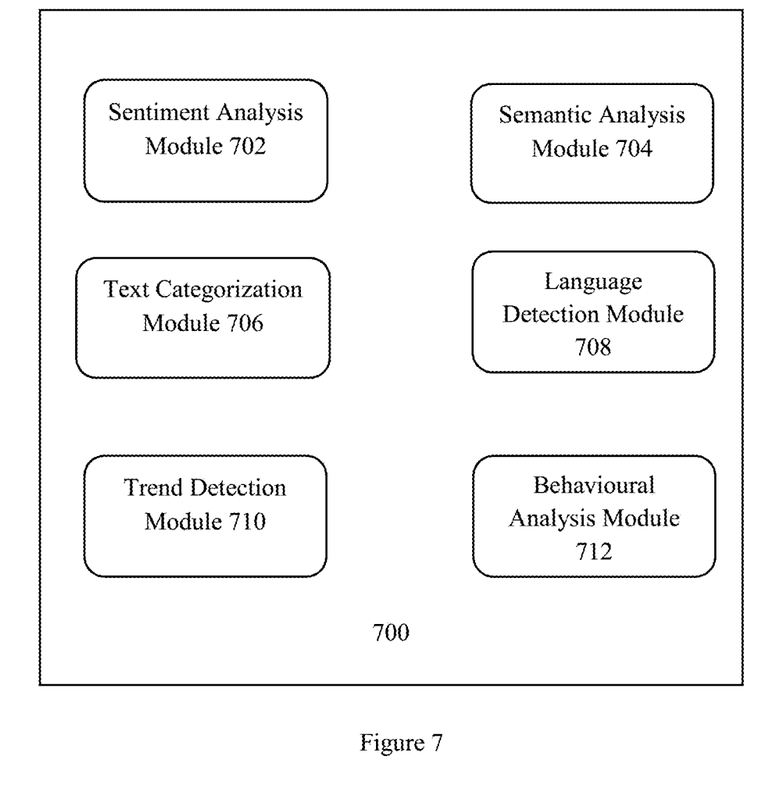
FIG. 7 illustrates various modules of the AI sub-system, in accordance with an embodiment of the present subject matter.

In an embodiment, the moderation of the privilege rights may be managed by an Artificial Intelligence (AI) subsystem 700 (refer to FIG. 7). For example, the AI subsystem may employ one or more algorithms to examine member interactions, communication patterns, and content relevance. The AI subsystem may analyze member interactions by monitoring how members engage with each other, the frequency and nature of their interactions, and any violations of community guidelines or rules. The AI subsystem may analyze how members communicate, identifying patterns indicating positive or negative behavior.

The AI subsystem may assess the quality and appropriateness of the content of the published message. The AI subsystem may determine whether content is relevant and complies with content guidelines. To continuously learn from data, the AI subsystem may use one or more machine learning models. The AI subsystem may modify the moderation strategy in response to changing user patterns and behaviors. For example, the AI subsystem may identify emerging trends in rule violations and take appropriate action. In yet another embodiment, the AI subsystem may recognize a change in the job title or responsibilities of an employee of an organization and automatically adjust the privilege rights associated with the new role of the employee. The AI subsystem may operate in real-time, making instant decisions regarding privilege rights based on the analysis, thereby allowing the AI subsystem to suggest changes to privilege rights that will improve communications dynamics.

In an embodiment the system may store the one or more published messages on a server as the message nodes. The message nodes may be processed, routed, and stored independently. In an embodiment, one or more messages stored as a message node may include images, audio, video, text, hyperlinks, or any other content. The content of the message node may be associated with metadata such as timestamp, sender, recipient, and any relevant context information. In an embodiment, the system may query the stored message nodes on the server. The query may include recommending messages and searching and retrieving specific messages based on one or more presented criteria. The query may be generated by the chief administrator user, administrator of the circle, one or more authorized members, or by an AI subsystem.

The AI subsystem (as shown in FIG. 7) may derive insights from the stored message nodes. In an embodiment, the AI subsystem may derive the insights to provide answers to the one or more queries prompted by one or more members of a respective circle in the hierarchical structure. The one or more techniques to generate the insights may include, but not limited to, sentiment analysis, text classification, member behavior analysis, language preference, messaging pattern, and communication trends. For example, the AI subsystem may use one or more machine learning models, algorithms, language processing techniques, statistical analysis, neural networks, and the like to derive the insights from the text like the stored messages.

The AI subsystem may access and analyze the information, maybe in the form of messages and the like, provided by the members of different circles to provide the answers. The messages may include data related to text content, emoji's, emoticons, Images or GIFs, links, attachments, time stamps, contact information, and the like. When a query is posted, the AI subsystem may examine the query, consider its context, and may create an insightful answer. For example, the AI subsystem 700, collects the data, via preprocessor and data collector module, of the stored messages and preprocesses the data to remove noise and irrelevant information, for example, advertisements, spam, unrelated links, or attachments, off the topic content, and the like. The preprocessor and data collector module may use one or more techniques to remove the noise like, filtering mechanism for example content classification or regex patterns, user preferences, and the like.

The AI subsystem may analyze the stored messages by performing one or more sentiment analysis, text classification, behavioral analysis, language analysis, communication pattern analysis, message trend analysis and the like. For example, a sentiment analysis module 702 may be trained with the given data of the stored messages and may identify the emotional tone of the data, such as positive, negative, or neutral sentiments. The sentiment analysis module may analyze sentiment scores and patterns to understand members' opinions or sentiments regarding a specific topic. For example, in the case of a vote or poll on a particular topic, the sentiment analysis module may analyze the sentiments of the responses by the members of the circles to obtain their opinions. The sentiment analysis module may evaluate each communication by taking into account its language, tone, explicit material, hate speech, and any other standards outlined by the system's policies. The system's policies may specify acceptable and prohibited content lists. In an embodiment, the sentiment analysis module may be trained on predefined chat rules and guidelines that indicate what is considered appropriate behavior within the messaging platform.

In an embodiment, the semantic analysis module 704 incorporates a machine learning model that may be trained on a labeled data set to determine the appropriateness of the behavior. For example, training the data set consists of examples of text data that have been labeled or classified as either appropriate or inappropriate based on predetermined standards or norms, such as user comments, messages, or content, community norms, laws, or the terms of service of the messaging platform and the like. Further, the labeled set's text data may be processed to find pertinent features. These features may be specific words, phrases, or textual patterns. The feature extraction may help convert the unstructured text into a format that the machine learning model may work with.

In an embodiment, the machine learning model may be trained using the labeled data set and extracted features. For example, a natural language processing (NLP) model may be utilized for training. The model may be trained to understand the semantic nuances in the text that may indicate inappropriate behavior. The semantic analysis module, which incorporates the trained model, performs semantic analysis on the text data. This analysis may involve assessing the meaning, context, and language used in the data of the stored messages to determine whether the data aligns with the predefined guidelines. The semantic analysis module may take into account elements including word choice, context, and textual intent. The semantic analysis model may flag upon determination that a message has violated the policies of the platform. To this end, the system 102 may generate a notification for the member who has sent the offensive message.

In an embodiment, the AI subsystem may maintain a record of violations and warnings, aiding in the monitoring of member's behavior over time and allowing for appropriate actions if repeated violations occur. For example, AI subsystem may make recommendations to block or remove the members who are serial offenders from a specific sub circle.

In one embodiment, the authorized member may have the privilege rights to send warnings or remove the respective member from the circle upon violations. In an embodiment, the semantic analysis module may examine historical behavior patterns to determine whether or not contentious issues have previously been debated and their conclusions. In an embodiment, semantic analysis module may conduct analysis in the respective circles of the hierarchical structure to understand the connections and interactions between users, revealing influential nodes or potential opinion leaders within the circles.

In an embodiment, the AI subsystem may classify for example, the text of the stored messages based on, for example, intent, a specific topic, tone, goal, and the like. For example, a text categorization module 706, incorporating a machine learning model that may be trained to classify text into different categories. For example, a discussion highlighting political topics would be categorized under the topic 'Politics.' The text categorization model may be trained using supervised learning. Labelled text examples and their accompanying intended categories (such as intent, topic, tone, and objective) may be included in the training data. This data may be used by the text categorization module to identify patterns and features that accurately classify unknown text into the designated categories. For example, if a user queries regarding providing messages or articles related to cyber security that has been posted in the messaging platform. The AI subsystem may use the text categorization module to categorize the previously stored content and fetch the required information.

In an embodiment, the AI subsystem may analyze patterns in communication to identify typical behaviors of the users or members in a specific circle. The AI subsystem may use clustering algorithms like K-means hierarchical clustering to group members based on communication styles, message posting frequency, response time, or preferences. The message posting frequencies, response time, and the like may be used to determine the active members, engagement levels and the like of the members. For example, if the system receives a query regarding number of members being active in a particular time frame. The AI subsystem may analyze the patterns of the behaviors of the members to determine the response to this query.

In an embodiment, the AI subsystem may analyze different languages in the previous communication instances. The AI subsystem may use language detection module 708 to identify the dominant language used by each member. For example, the language detection module may include one or more deep learning models like Convolutional Neural Networks (CNNs) or Recurrent Neural Networks (RNNs) to detect languages. The deep learning models may be trained based on the features extracted from the text of stored messages like but not limited to character sequences, word frequencies, and linguistic patterns to classify the text into a particular language or languages. For example, the AI subsystem may receive a query regarding messages being posted in a particular language by different members of the circles. The AI subsystem may use the language detection module to resolve this query.

In an embodiment, the AI subsystem may analyze the frequency, timing, and patterns of messages sent by members of respective circles. For example, the AI subsystem may apply pattern recognition module to determine whether communication anomalies or regular messaging patterns exist, like but not limited to, message length, use of media, specific phrasing to understand how members communicate, text structure patterns, like recognizing the structural heads of the text, such as headings, paragraphs, bullet points, or lists, time related patterns, emoticon or emoji patterns, grammatical or linguistic patterns. In an embodiment, the pattern recognition module may include a machine learning model or algorithm for pattern recognition for example, algorithms like decision trees, neural networks, support vector machines, may be used. In an embodiment, the AI subsystem may use trend detection module 710 to identify communication trends over a specific period. For example, identify emerging topics, popular phrases, or shifts in sentiment over time to understand evolving communication trends.

In an embodiment, the AI subsystem may analyze the preference and behavior of the members of the respective circles, based on the exchanged messages and data associated with member's profile. For example, the AI subsystem, via behavioral analysis module 712 may define a threshold to determine activeness of the member. The threshold may be determined based on the hours spent by members on the platform, number of replies or responses, number of queries posted, or any combination of these. In an embodiment, the AI subsystem, via the behavioral analysis module, may analyze wants and needs of the member and suggest appropriate products and services being advertised on the platform to the member. To suggest the appropriate products or services the AI subsystem may gather and analyze data about the members' preferences, past purchases, interactions, demographic information, and any other relevant data. The AI subsystem, based on the analysis, determines the user's preferences, tastes, and potential needs in terms of products or services. For example, the AI subsystem may employ member-based collaborative filtering to assess a member's preferences in light of those of other members who share those preferences. Similar products enjoyed by members may suggest that they have similar likes and preferences. In an embodiment, the AI subsystem may employ item-based collaborative filtering to examine user interactions and provide recommendations based on the similarities between the items that a member has expressed an interest in. In an embodiment, the AI subsystem may use Natural Language Processing (NLP) techniques to analyze textual data to determine members' preferences and interests based on the topics discussed or mentioned in their interactions. The AI subsystem may refine recommendations over time to increase the usefulness and efficacy of the adverts it displays to users.

In an embodiment, system 102 may store the messages based on specific needs, requirements, or member/user defined rules. In an embodiment, the system may include a diverse range of storage options that provides members with flexibility and versatility in managing data and resources. For example, the system may include one or more storage types like local storage, cloud storage, network attached storage, external drives, optical storage, hybrid storage (combination of cloud storage and local storage). The system may provide an option via user device interface to select one of the options for storage. The storage option may be selected based on one or more requirements such as volume of storage data, type of data to be stored, access patterns associated with the data for example frequency of access, concurrent access, temporal access and the like, performance requirements, cost concerns, and scalability needs. In an embodiment, the performance criteria and expectations that specify how the data should be accessed, processed, and retrieved from the storage system are referred to as the performance requirements of the data to be stored.

In an embodiment the system may allow only the verified or authorized member may have access to the stored data. In an embodiment the member may be one of the basic verified and completely verified. For example, the member may be completely verified when the member provides a government issued ID for verification. In an embodiment, the data may be stored as one of blocks, objects, or within a file system. In an embodiment, the block storage may refer to the data being stored in fixed-sized blocks. The size of the blocks may be between a few bytes and several megabytes in size. Each block may have a unique identification number and may be maintained separately. Block storage may be used when the platform needs fast and low-latency access to data. In an embodiment, data may be stored in discrete, adaptable components called objects in object storage. Each object may include actual data, metadata and a unique identification. In an embodiment, in the file system storage data may be arranged into a hierarchical structure of directories and files. Each file may include a name and may be arranged according to how it relates to other files.

In an exemplary embodiment, a customer's history and communication or messaging history may be stored on the cloud storage. For instance, with a banking organization, a customer interacts with the bank about a range of money-related issues. Numerous communication channels, including email, phone conversations, in-branch meetings, and even websites or mobile apps, may be used for this communication. Various interactions between the bank and a customer in the form of messages, and notes related to these interactions may be securely stored on cloud storage. The cloud storage serves as a centralized repository for these communication records. In an example, each interaction may be associated with relevant customer and account information, timestamps, and other relevant metadata. The organizational structure of the bank may change over time. For instance, reassignments, promotions, or personnel turnover may result in a change in the customer's account manager or relationship manager. The newly assigned manager may access the cloud-based system to review the customer's entire communication history. For example, specific interactions, chronological history, previous emails, call records, in-branch notes, etc. The new manager may offer a smooth handoff from the previous management and address any unresolved or ongoing issues.

In an embodiment, the system may provide access to the published messages to a new member joining at least one of the genesis circle and sub circles. The system may authorize one of the chief administrators, administrator, or one more authorized members to enable one or more new member to join a genesis circle or sub-circle. In an embodiment, the enablement of the new member may be via user graphical interface of the user device. Upon joining a circle or sub-circle, the system may identify the messages that have been previously published within a circle or sub-circle that the new member has joined. The system may retrieve identified messages stored in the server and grant access to the newly joined member. The newly joined members may be able to review past discussions, content, and interactions, and the like. The retrieved messages may be provided in a user-friendly format, often organized chronologically. The newly joined member may interact with the retrieved messages, such as liking, commenting, or replying. The messages provide the new member information about current conversations, shared materials, and the general climate within the circle or sub-circle. In an embodiment, the system may add a security level to the circle. In yet another embodiment, the system may allow a member of the circle to add a security level to the circle. The security level indicates a member type that can join the circle. The member type may include a verified member or basic member. The verified member may further include the basic verified member or the complete verified member, as discussed in above embodiments. The system may authorize one of the chief administrators, administrators, or other one or more authorized members of the genesis circle or sub-circles, to add the security level.

The method and system disclosed in the present application have various technical advantages, and the same are listed below:

Efficient Messaging: With this hierarchical messaging platform, the messages are routed in an efficient manner and transmitted to the entire hierarchical structure in one go. With this approach, resources used are less, and the time taken to share a message across the hierarchical structure of the organization is faster.

Selective messaging through a seamless user interface: due to privileged rights given to every member, the moderator of a circle can selectively send messages to a specific circle or sub-circle within the organization without much hassle. All this can be done with a seamless user interface.

Enhanced Communication and Collaboration: By offering a unified platform where departments and sectors can quickly share information, updates, and resources, such a system encourages effective communication and collaboration. This results in improved cooperation and more simplified workflows.

Reduced Information Silos: the system makes sure that vital information is available to all pertinent parties, avoiding duplication of effort and lowering the chance of crucial information becoming isolated inside departments.

Cross-Departmental Cooperation: When all sectors and departments have access to a single platform, it is easier to facilitate cross-departmental cooperation. Employees are better able to work together on projects, exchange ideas, and combine resources.

Data Analytics and Informed Decision-Making: Organizations can collect data from diverse industries and departments using a uniform system, enabling thorough analytics. This data-driven strategy allows for well-informed decision-making based on an overall understanding of the performance and operations of the organization.

User-Friendly Interface: Employee adoption and efficient use of the platform are made easier by a well-designed system with an intuitive user interface.

The method and system disclosed in the present application have various applications, and the same are listed below:

Intranets: The system acts as a cutting-edge corporate intranet, giving staff members a central location for collaboration, communication, document sharing, and resource access.

Team Collaboration: By providing tools for team conversations, file sharing, and collaborative document editing, the system and method enables team collaboration and makes it simpler for teams to cooperate effectively.

Knowledge Management: The system and the method may be used as a platform for knowledge management, enabling businesses to collect, preserve, and distribute institutional knowledge, best practices, and training materials.

Government and Public Services: Government organizations may utilize the system and method to improve departmental communication, public information dissemination, and efficiently manage public services, and the like. Thus, the disclosed method and system can be utilized in various organizations for efficient bi-directional communication by dynamically routing the messages.

Intranet connectivity: The messaging platform provides computing, storage, and intranet connectivity in situations of national defense where connecting to the internet is a high risk for cyber-attacks.

Establishing Wide Area Network: The messaging platform is handy in natural disasters that may uproot the communication network, to quickly establish a Wide Area Network to communicate and provide services to the citizens affected by the earthquake, floods, and fires.

Controlling information flow: The interaction and information flow can be effectively controlled by treating the messages, circles, users, as nodes. This ensures that communications are recommended and seen by the appropriate people and groups.

Although implementations for methods and system for user verification have been described in language specific to structural features and/or methods, it is to be understood that the appended claims are not necessarily limited to the specific features or methods described. Rather, the specific features and methods are disclosed as examples of implementations for user verification.

The invention claimed is:

1. A method for facilitating communication in an organization, comprising:
   creating, by a processor, a hierarchical messaging structure comprising one or more hierarchy levels of the organization, wherein the hierarchical messaging structure comprises a plurality of circles structured at least in a genesis circle and one or more sub-circles, and wherein each circle includes one or more members;
   publishing, by a processor, a message by a member from at least one of the one or more members of the genesis circle and the sub-circles, wherein the message is dynamically routed according to privilege rights defined in at least one of the genesis circle and the one or more sub-circles, and wherein the privilege rights are moderated to enable a two-way communication in at least one of within the one or more sub-circles and between the genesis circle and the one more sub-circles;
   displaying, by a processor, the message selectively at least in one of the genesis circle and the one or more sub-circles of the organization;
   storing the published message;
   querying the stored message; and
   deriving insights from the stored messages, wherein the insights are derived by an analysing the stored messages to answer one or more queries prompted by at least the one or more members of the genesis circle and the sub-circle, and wherein the insights include sentiment insights, derived using sentiment analysis of one or more of: language, tone, speech, and one or more policies, to answer the one or more queries;
   providing answer to the one or more queries prompted by the at least the one or more members of the genesis circle and the sub-circle, based on the derived insights.

2. The method of claim 1, wherein the genesis circle, the sub-circles, one or more published message, one or more members in the organization act as a node.

3. The method of claim 2, wherein the message is dynamically routed to at least one of a sub-circle node and a genesis circle node, based on one or more similarities between the at least one of the sub-circle node and the genesis circle node, and one or more member nodes publishing the message.

4. The method of claim 2, wherein the message is dynamically routed based on a distance between respective nodes.

5. The method of claim 2, wherein the one or more published message nodes are stored in at least one of a local storage, a cloud-based storage, a hybrid storage, a network attached storage, an external drive, and an optical storage.

6. The method of claim 1, further comprising providing one or more options to a member for publishing the message across the hierarchy of the organization.

7. The method of claim 1, wherein the moderation of the privilege rights is performed by an administrator of at least the genesis circle and the one or more sub-circles.

8. The method of claim 7, wherein the moderation of the privilege rights is managed by an Artificial Intelligence (AI) subsystem.

9. The method of claim 7, wherein the AI subsystem provides recommendation to perform at least one of blocking a member from the sub-circle and removing a member from the sub-circle.

10. The method of claim 1, further comprising adding a security level for at least one of the genesis circles and the one or more sub-circles, wherein the security level indicates a member type that can join circles, wherein the member type is at least one of a verified member and a basic member.

11. The method of claim 1, wherein the insights are derived
   from the stored messages by using at least one or more techniques: sentiment analysis, text classification, the member behavior analysis, language preference, messaging pattern, and communication trends.

12. The method of claim 1, wherein the message is dynamically routed based on at least one of the privilege rights of the member and one or more recommendations.

13. The method of claim 1, further comprising configuring the privileged rights for allowing only a verified member to send the message.

14. The method of claim 1, wherein the one or more hierarchy levels of the organization is based on at least one of a designation, an authority, an expertise, a project, a responsibility, and the organization structure.

15. The method of claim 1, wherein creating the hierarchical messaging structure further comprising:
   creating the genesis circle;
   creating one or more sub-circles under the genesis circle, wherein the one or more sub-circles correspond to a first level in the one or more hierarchy levels of the organization.

16. The method of claim 15, further comprising:
   creating one or more sub-circles at a second level under the one or more sub-circles of the first level; and
   creating the one or more sub-circles corresponding to the second level.

17. The method of claim 1, further comprising:
analyzing the message prior to publishing, wherein the analysis is performed using a message analyzer model; and
selectively publishing the message based on an outcome of the message analyzer model.

18. The method of claim 1, wherein the genesis circle and the sub circles are associated with a particular geographical boundary.

19. A system for facilitating communication in an organization, comprising:
a memory; and
a processor communicatively coupled with the memory, wherein the processor is configured to execute one or more instructions stored in the memory to:
create a hierarchical messaging structure comprising one or more hierarchy levels of the organization, wherein the hierarchical messaging structure comprises a plurality of circles structured in a genesis circle and one or more sub-circles, and wherein each circle includes one or more members;
publish a message by a member from at least one of: the one or more members of the genesis circle and the sub-circles, wherein the message is dynamically routed according to privilege rights defined in at least one of the genesis circle and the one or more sub-circles, and wherein the privilege rights are moderated to enable a two-way communication in at least one of within the one or more sub-circles and between the genesis circle and the one more sub-circles;
display the message selectively at least in one of the genesis circle and the one or more sub-circles of the organization store the published message;
query the stored message; and
derive insights from the stored messages, wherein the insights are derived by analysing the stored messages to answer one or more queries prompted by at least the one or more members of the genesis circle and the sub-circle, and wherein the insights include sentiment insights, derived using sentiment analysis of one or more of: language, tone, speech, and one or more policies, to answer the one or more queries; and
providing answer to the one or more queries prompted by the at least the one or more members of the genesis circle and the sub-circle, based on the derived insights.

* * * * *